United States Patent
Namiki

(10) Patent No.: US 11,989,928 B2
(45) Date of Patent: May 21, 2024

(54) IMAGE PROCESSING SYSTEM

(71) Applicant: FANUC CORPORATION, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/921,030

(22) Filed: Jul. 6, 2020

(65) Prior Publication Data

US 2021/0042576 A1 Feb. 11, 2021

(30) Foreign Application Priority Data

Aug. 7, 2019 (JP) .................................. 2019-145399

(51) Int. Cl.
*G06V 10/774* (2022.01)
*G06F 18/21* (2023.01)
*G06F 18/214* (2023.01)

(52) U.S. Cl.
CPC .......... *G06V 10/774* (2022.01); *G06F 18/214* (2023.01); *G06F 18/217* (2023.01); *G06V 2201/06* (2022.01)

(58) Field of Classification Search
CPC .... G06N 20/00; G06K 9/6256; G06K 9/6262; G06K 9/6212; G06K 9/62
See application file for complete search history.

(56) References Cited

U.S. PATENT DOCUMENTS

| | | | | |
|---|---|---|---|---|
| 10,474,926 | B1* | 11/2019 | Dirac | G06K 9/6227 |
| 2002/0110279 | A1* | 8/2002 | Dobeck | G01S 15/8902 |
| | | | | 382/228 |
| 2008/0013836 | A1* | 1/2008 | Nakamura | G06V 10/50 |
| | | | | 382/209 |
| 2009/0041340 | A1* | 2/2009 | Suzuki | G06V 40/172 |
| | | | | 382/159 |
| 2009/0141973 | A1* | 6/2009 | Wallack | G06V 10/28 |
| | | | | 382/165 |
| 2010/0272350 | A1* | 10/2010 | Lee | G06V 10/70 |
| | | | | 382/165 |
| 2015/0339516 | A1* | 11/2015 | Yano | G06T 7/74 |
| | | | | 382/118 |
| 2016/0196503 | A1* | 7/2016 | Guan | G06N 3/08 |
| | | | | 706/12 |
| 2017/0177970 | A1* | 6/2017 | Kitajima | G06V 10/44 |

(Continued)

FOREIGN PATENT DOCUMENTS

| | | |
|---|---|---|
| JP | 2005-071125 A | 3/2005 |
| JP | 2014-063281 A | 4/2014 |

(Continued)

*Primary Examiner* — Wen W Huang
(74) *Attorney, Agent, or Firm* — Studebaker & Brackett PC

(57) ABSTRACT

An image processing system that detects a picture of an object from an image in which the object is captured includes: a first detector that detects a picture of the object from the image based on a model pattern representing a feature of the picture of the object; a learning device that learns a learning model using the image used for detection by the first detector as input data, and using a detection result by the first detector as training data; and a second detector that detects the picture of the object from the image based on the learning model learned by the learning device.

17 Claims, 9 Drawing Sheets

(56) References Cited

U.S. PATENT DOCUMENTS

| | | | |
|---|---|---|---|
| 2018/0020207 A1* | 1/2018 | Sugimura | G01B 11/245 |
| 2018/0032031 A1* | 2/2018 | Du | G06T 19/20 |
| 2018/0189610 A1* | 7/2018 | Kandemir | G06K 9/6284 |
| 2018/0211374 A1* | 7/2018 | Tanaka | G06N 20/00 |
| 2018/0260628 A1* | 9/2018 | Namiki | G06T 7/73 |
| 2018/0268256 A1* | 9/2018 | Di Febbo | G06T 7/001 |
| 2019/0012579 A1* | 1/2019 | Namiki | G06V 10/454 |
| 2019/0073557 A1* | 3/2019 | Matsuda | G06V 10/774 |
| 2020/0005069 A1* | 1/2020 | Wang | G06N 3/045 |
| 2020/0074685 A1* | 3/2020 | Davis | G06T 11/20 |
| 2020/0126253 A1* | 4/2020 | Chien | G06K 9/00208 |
| 2020/0210764 A1* | 7/2020 | Hamedi | G06V 10/764 |
| 2020/0302207 A1* | 9/2020 | Perkins | G06T 7/593 |
| 2020/0394460 A1* | 12/2020 | Shiraishi | G06F 18/214 |
| 2020/0402251 A1* | 12/2020 | Ban | G06N 3/08 |
| 2021/0012524 A1* | 1/2021 | Tomochika | G06K 9/3208 |
| 2021/0027103 A1* | 1/2021 | Brower | G06K 9/2054 |
| 2021/0034920 A1* | 2/2021 | Edgar | G06N 5/04 |
| 2021/0287080 A1* | 9/2021 | Moloney | G06N 3/0454 |

FOREIGN PATENT DOCUMENTS

| | | |
|---|---|---|
| JP | 2015-219797 A | 12/2015 |
| JP | 2017-091079 A | 5/2017 |
| JP | 2018-200531 A | 12/2018 |

\* cited by examiner

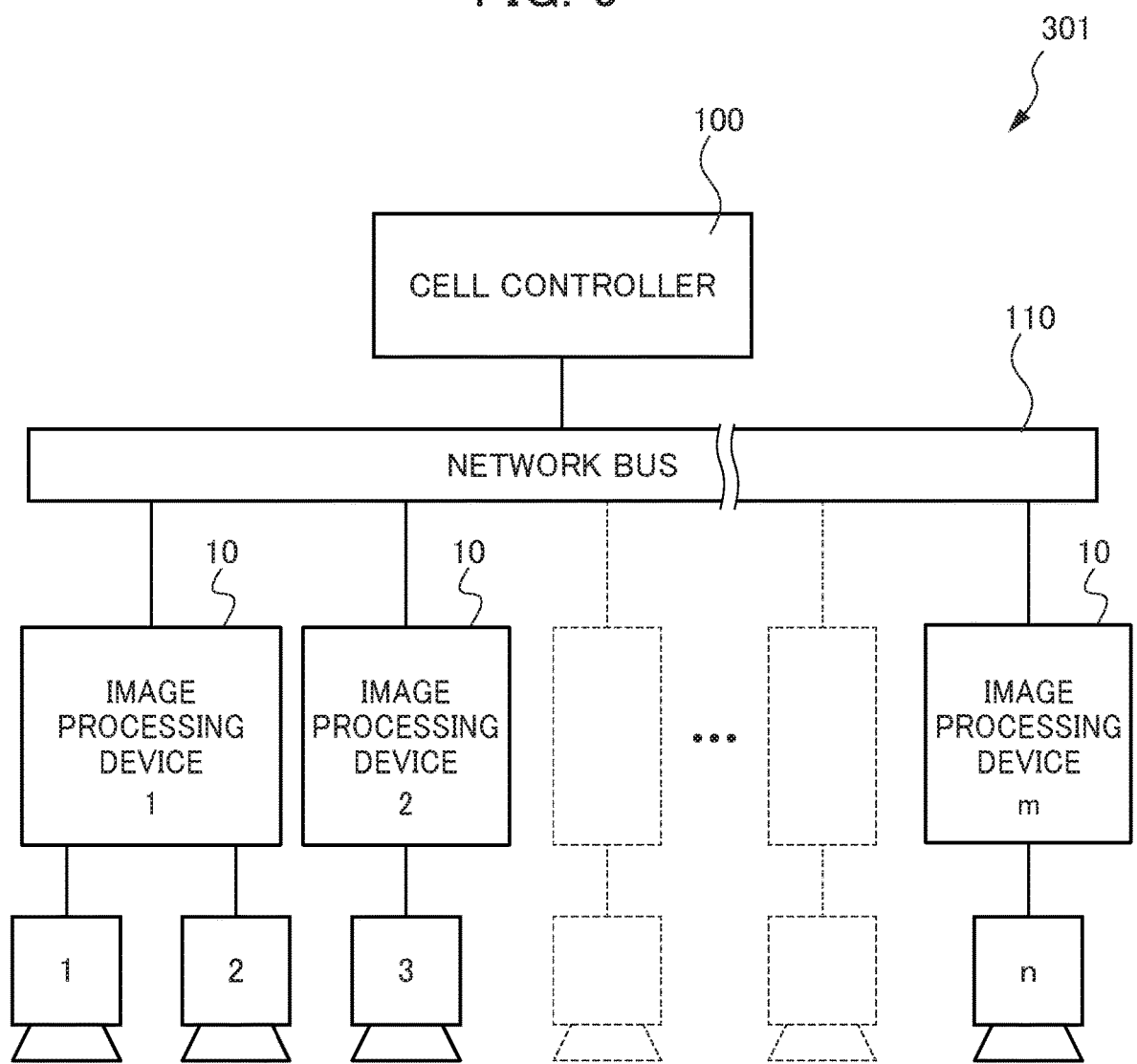

IMAGE PROCESSING SYSTEM

This application is based on and claims the benefit of priority from Japanese Patent Application No. 2019-145399, filed on 7 Aug. 2019, the content of which is incorporated herein by reference.

BACKGROUND OF THE INVENTION

Field of the Invention

The present invention relates to an image processing system.

Related Art

As an image processing system for detecting a picture of an object from an image in which the object is captured, a system for detecting a picture of the object based on a model pattern representing a feature of the picture of the object has been known (for example, see Japanese Unexamined Patent Application, Publication No. 2017-91079).

Furthermore, as an image processing system for detecting a picture of an object from an image in which an object is captured, a system for learning appropriate features according to the object using machine learning and detecting a picture of the object has been known (for example, see Japanese Unexamined Patent Application, Publication No. 2018-200531).

Patent Document 1: Japanese Unexamined Patent Application, Publication No. 2017-91079
Patent Document 2: Japanese Unexamined Patent Application, Publication No. 2018-200531

SUMMARY OF THE INVENTION

In an image processing system using a model pattern representing a feature of a picture of an object, since detection is performed by focusing on one of the features of the object (e.g., contour), the feature may become invisible due to a change in brightness or the like, and sometimes it becomes impossible to detect the object.

In this regard, the image processing system using machine learning can enhance robustness more than the image processing system using the model pattern representing the feature of the picture of the object does. However, in a case of deep learning, for example, it is necessary to annotate (e.g., label) many images having different positions and attitudes of objects in order to generate training data. Such a setting work causes users to move away from using deep learning. Furthermore, in general, users perform labeling manually. Such setting work is a factor that lowers the accuracy.

Thus, in the field of image processing for detecting a picture of an object from an image in which the object is captured, the improvement of robustness, workability of the setting, and detection accuracy is desired.

An image processing system according to an aspect of the present disclosure is an image processing system that detects a picture of an object from an image in which the object is captured, and the system includes: a first detector that detects a picture of the object from the image based on a model pattern representing a feature of the picture of the object; a learning device that learns a learning model using the image used for detection by the first detector as input data, and using a detection result by the first detector as training data; and a second detector that detects the picture of the object from the image based on the learning model learned by the learning device.

According to the present disclosure, in the field of image processing for detecting a picture of an object from an image in which the object is captured, it is possible to improve robustness, workability of setting, and detection accuracy.

BRIEF DESCRIPTION OF THE DRAWINGS

FIG. 9 is a diagram schematically showing an example of an image processing system 301 to which a plurality of image processing devices according to the present embodiment are connected.

DETAILED DESCRIPTION OF THE INVENTION

Figure 1:
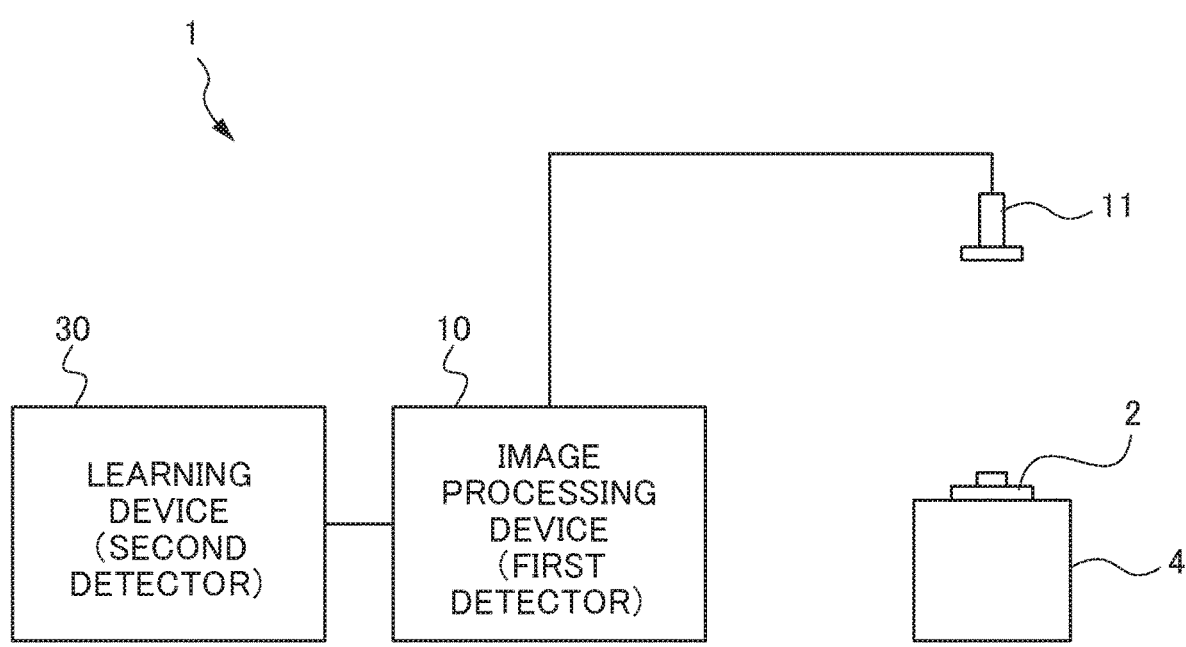
FIG. 1 is a diagram showing an example of an image processing system according to the present embodiment.

Hereinafter, a description will be given of an example of an embodiment of the present invention with reference to the accompanying drawings. It should be noted that the same reference numerals will be given to the same or equivalent parts in the drawings.

Figure 2:
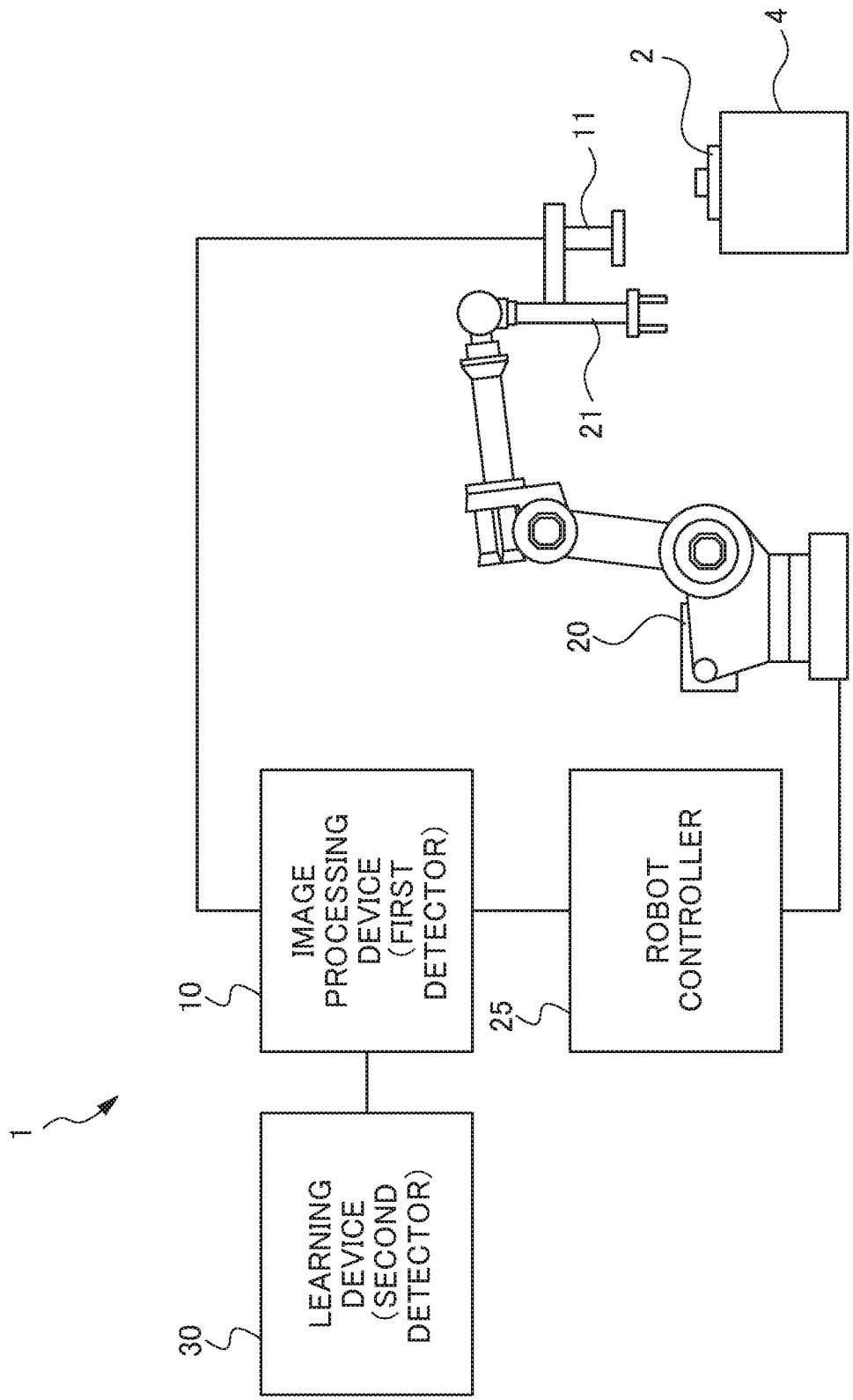
FIG. 2 is a diagram showing another example of the image processing system according to the present embodiment.

FIG. 1 is a diagram showing an example of an image processing system according to the present embodiment. FIG. 2 is a diagram showing another example of the image processing system according to the present embodiment. The image processing system 1 is a system having the two detection functions of: a function of detecting a picture of an object 2 from an input image 5 (see FIG. 5) based on a model pattern 50 (see FIG. 6) representing a feature of the picture of the object 2; and a function of detecting a picture of the object 2 from the input image 5 based on a learning model.

The image processing system 1 shown in FIG. 1 includes a vision sensor 11, an image processing device (first detector) 10, and a learning device (second detector) 30, and the position of the vision sensor 11 is fixed. The object 2 is mounted on a work table 4. The vision sensor 11 is an image capturing device such as a camera for imaging the object 2. The vision sensor 11 is fixed at a position capable of imaging the object 2 by a support means (not shown). The image information acquired by the vision sensor 11 is transmitted to the image processing device 10.

The image processing device (first detector) 10 detects a picture of the object 2 from the input image 5 (see FIG. 5) received from the vision sensor 11 by image processing described later. The learning device (second detector) 30 learns the learning model based on the detection result by the image processing device (first detector) 10 and detects a picture of the object 2 from the input image 5 (see FIG. 5) received from the vision sensor 11 based on the learning model.

On the other hand, the image processing system 1 shown in FIG. 2 further includes a robot 20 and a robot controller 25 in the image processing system 1 shown in FIG. 1, and the position of the vision sensor 11 is movable. The robot 20 is an arm type robot to which a robot hand 21 is mounted at the tip. The vision sensor 11 is fixed to the robot hand 21 serving as a hand of the robot 20. The robot hand 21 is a movable portion which moves by the robot 20 or its own mechanism. Therefore, the position of the vision sensor 11 will also move. It should be noted that the robot hand 21 of the robot 20 may grip the object 2, and may cause the object 2 to move in the field of view of the vision sensor 11 which is fixedly installed.

The image processing device 10 that performs image processing is configured to communicate with the robot controller 25 that controls the movement of the robot 20 or the like, and can exchange information between the image processing device 10 and the robot 20. The image processing device (first detector) 10 detects the picture of the object 2 by performing the image processing to be described later from the input image 5 from the vision sensor 11 (see FIG. 5), while considering the movement and state of the robot 20 and the robot hand 21. Hereinafter, the image processing device (first detector) 10 and the learning device (second detector) 30 in the image processing system 1 shown in FIGS. 1 and 2 will be described in detail.

Figure 3:
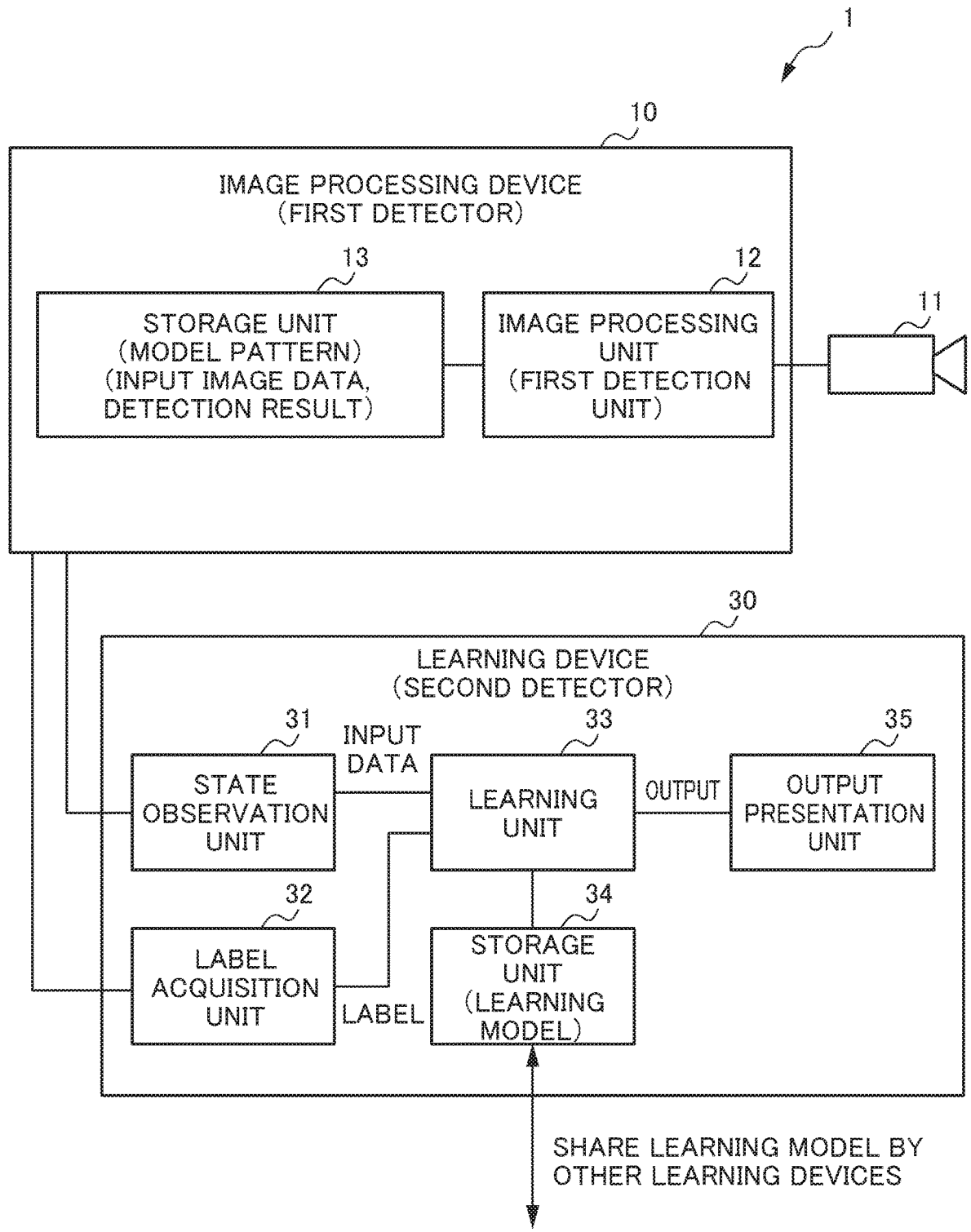
FIG. 3 is a diagram showing the configurations of an image processing device (first detector) and a learning device (second detector) in the image processing system according to the present embodiment.

FIG. 3 is a diagram showing the configurations of the image processing device (first detector) 10 and the learning device (second detector) 30 in the image processing system 1 according to the present embodiment.

First, the image processing device 10 includes an image processing unit 12 and a storage unit 13. The image processing unit 12 generates a model pattern modeling a picture of the object 2, for example, a model pattern representing a feature of the picture of the object 2. The storage unit 13 stores this model pattern. Hereinafter, an example of creating the model pattern 50 will be described.

Figure 4:
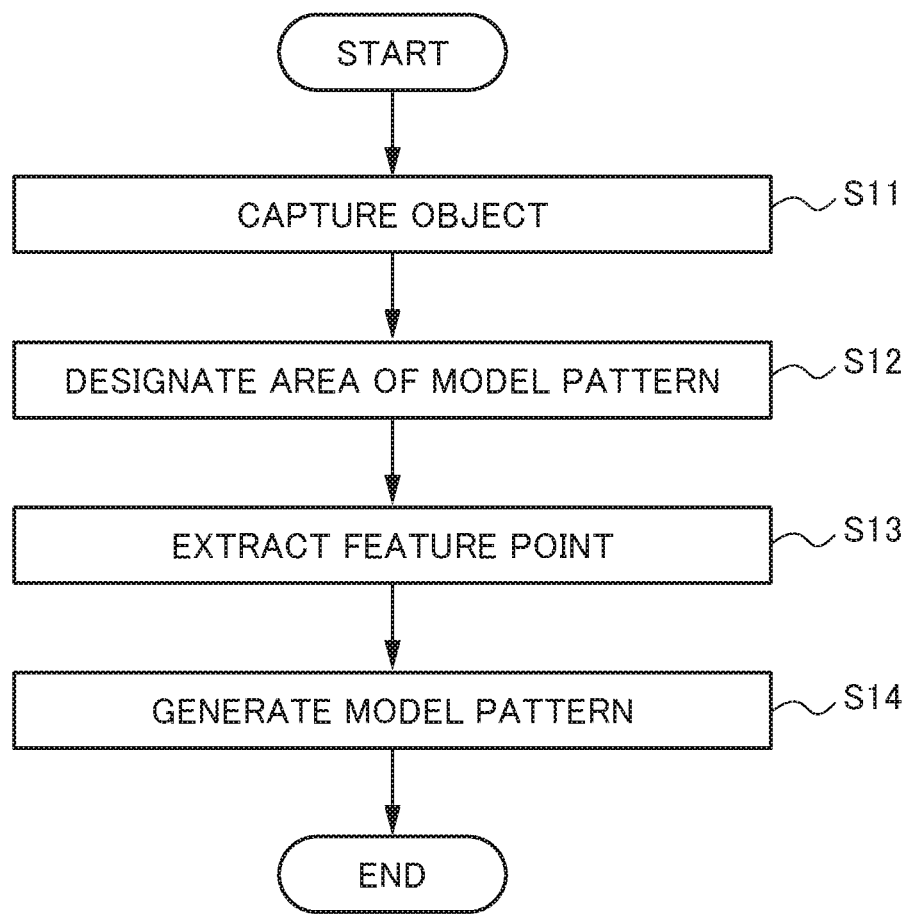
FIG. 4 is a flowchart showing a procedure for creating a model pattern.
Figure 5:
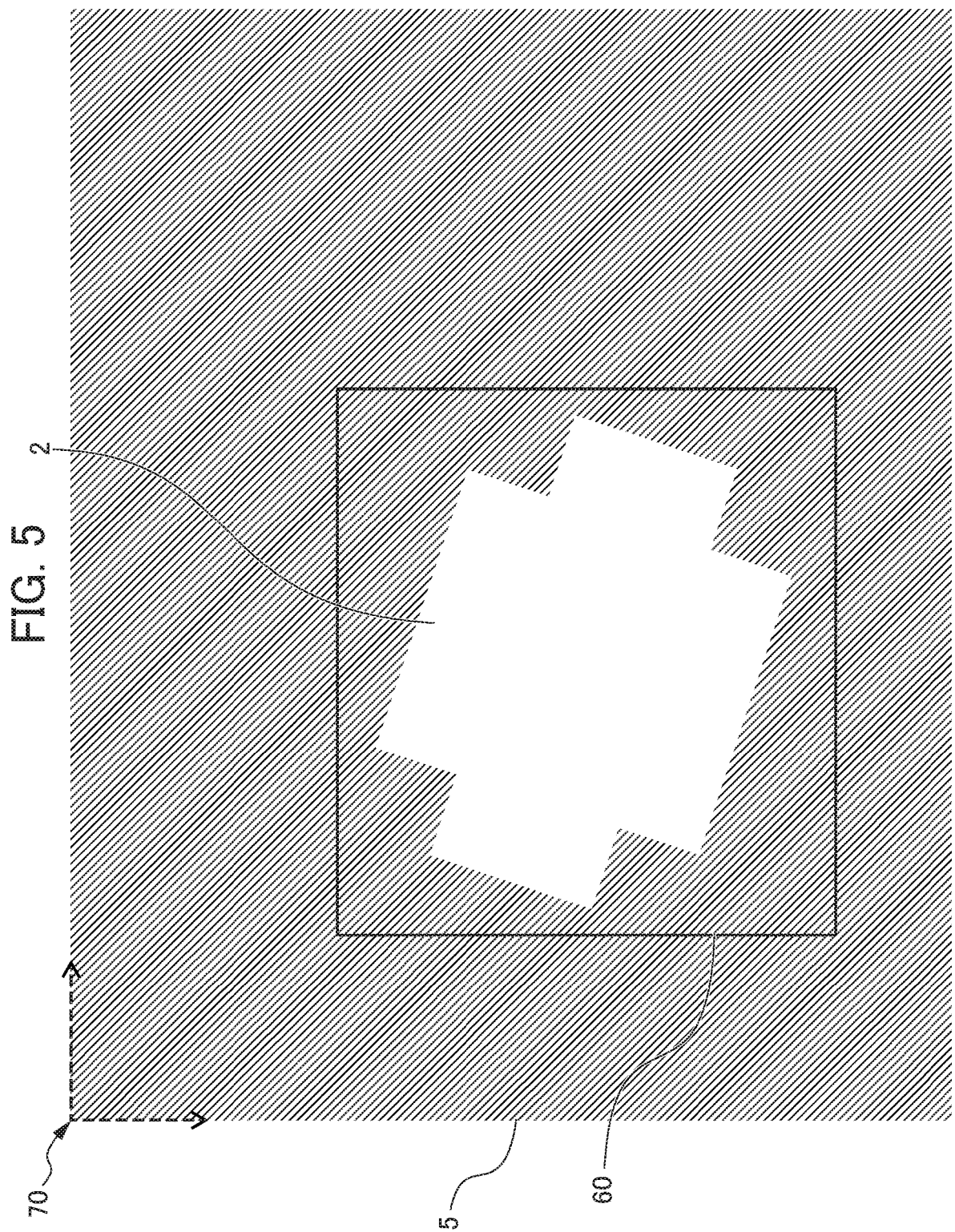
FIG. 5 is a diagram showing a state in which a model pattern designation region is designated in an image.
Figure 6:
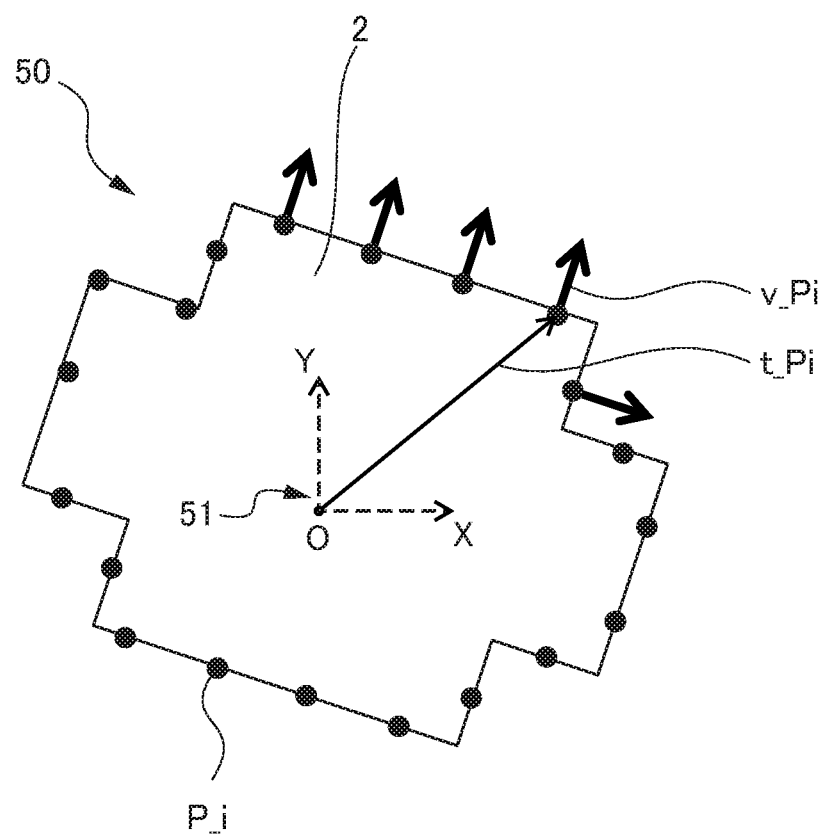
FIG. 6 is a diagram showing a model pattern composed of a plurality of feature points.

FIG. 4 is a flowchart showing a procedure for creating the model pattern 50. FIG. 5 is a diagram showing a state in which a model pattern designation area 60 is designated in an image. FIG. 6 is a diagram showing a model pattern. 50 composed of a plurality of feature points P_i.

As shown in FIG. 5, the image processing system 1 places the object 2 desired to be taught as the model pattern 50 in the field of view of the vision sensor 11 to capture a picture of the object 2, and acquires an input image 5 in which the object 2 is included (Step S11). At this time, it is preferable for the positional relationship between the vision sensor 11 and the object 2 to be the same as the positional relationship when the object 2 is detected in actual use.

The image processing system 1 designates a region in which the object 2 appears in the captured image as a region of the model pattern 50 (Step S12). Hereinafter, the area designated in Step S12 is referred to as a model pattern designation area 60. The model pattern designation area 60 of the present embodiment is designated as a rectangular shape or a circular shape so as to surround the object 2.

Next, the image processing system 1 extracts feature points (Step S13). The feature points constitute the model pattern 50. A plurality of feature points $P\_i$ (i=1 to NP) is extracted from the model pattern designation area 60. Methods for extracting the feature points $P\_i$ include various methods. In the present embodiment, the brightness gradient is a large point in the image, and edge points that can be used to acquire the contour shape of the object are used as the feature points $P\_i$.

The physical quantity of the edge point includes the position, the direction of the brightness gradient, the magnitude of the brightness gradient, and the like, of the edge point. When defining the direction of the brightness gradient of the edge point as the attitude of the feature point, it is possible to define the positional attitude of the feature point together with the position. As the physical quantity of the feature point, the physical quantity of the edge point, i.e. the position of the edge point, the attitude (the direction of the brightness gradient), the magnitude of the brightness gradient, are stored.

The model pattern coordinate system 51 is defined, and the physical quantity is represented by an attitude vector $v\_Pi$, a position vector $t\_Pi$, or the like of the feature point $P\_i$, based on the model pattern coordinate system 51 and the origin O. The origin O set in the model pattern coordinate system 51 is defined, for example, as the origin O of the centroids of all the feature points $P\_i$ constituting the model pattern 50. It should be noted that, as for the definition method of the origin O, it is possible to adopt an appropriate method, such as selecting any one point from the feature points $P\_i$. Furthermore, the method using the model pattern coordinate system 51 is also an example thereof, and the position and attitude of the feature point $P\_i$ can be represented using another method. Furthermore, the axial direction (attitude) of the model pattern coordinate system 51 may be defined such that, for example, arbitrary two points are selected from the feature points $P\_i$ constituting the model pattern 50, and the direction from one point to the other point is the X-axis direction, and the direction orthogonal to the X-axis direction is the Y-axis direction. It is also possible to define such that the image coordinate system and the model pattern coordinate system 51 are parallel to each other in the image in which the model pattern 50 is created. In this manner, the setting of the model pattern coordinate system 51 and the origin O can be appropriately changed according to circumstances. It should be noted that the method itself for extracting edge points as feature points is a well-known technique, and other detailed descriptions thereof are omitted.

Next, the image processing system 1 generates the model pattern 50 based on the physical quantity of the extracted feature point $P\_i$ (Step S14). The physical quantity of the extracted feature point $P\_i$ is stored in the storage unit 13 as feature point $P\_i$ constituting the model pattern 50. In the present embodiment, the model pattern coordinate system 51 is defined in the model pattern designation area 60, and the position and attitude of the feature point $P\_i$ are stored from the value represented by the image coordinate system 70 (see FIG. 5) with the value represented by the model pattern coordinate system 51 (see FIG. 6).

With reference to FIG. 3 again, the image processing unit 12 (first detection unit) detects a picture of the object 2 from the input image 5 based on a model pattern representing a feature of the picture of the object 2. First, the image processing unit 12 extracts feature points from the input image 5. The feature point may be extracted by the same method as the method of extracting the feature point when creating the model pattern. In the present embodiment, edge points are extracted from the input image and used as feature points.

Next, the image processing unit (first detection unit) 12 performs matching between the feature points extracted from the input image 5 and the feature points constituting the model pattern 50 to detect the object 2. There are various methods for detecting an object; however, well-known methods such as a generalized Hough transform, RANSAC, and ICP-algorithm can be used.

The storage unit 13 stores a detection result of the picture of the object 2 by the image processing device (first detector) 10 and data of the input image 5 corresponding to the detection result.

Next, a description will be given of the learning device (second detector) 30 with reference to FIG. 3. The learning device 30 performs machine learning using an input image used for detection by the image processing device (first detector) 10 as input data, and using a detection result (e.g., position, attitude, size) by the image processing device (first detector) 10 as training data. Thereafter, by utilizing the learning model constructed by this machine learning, the learning device (second detector) 30 detects a picture of the object 2 from the input image 5 including the object 2 from the vision sensor 11.

In order to construct such a learning model, the learning device (second detector) 30 includes a state observation unit 31, a label acquisition unit 32, a learning unit 33, a storage unit 34, and an output presentation unit (output use unit) 35.

The state observation unit 31 acquires input data from the image processing device (first detector) 10 and outputs the acquired input data to the learning unit 33. Here, as described above, the input data is data used for detection by the image processing device (first detector) 10, and is data of the input image 5 including the object 2.

The label acquisition unit 32 acquires a label from the image processing device (first detector) 10, and outputs the acquired label to the learning unit 33. Here, the label is the above-mentioned training data, that is, the detection result (for example, position, attitude, size) by the image processing device (first detector) 10.

The learning unit 33 constructs a learning model by performing supervised learning based on the input data and the label. As the learning unit 33, a known method such as YOLO (You Only Look Once) or SSD (Single Shot multi-box Detector) can be used.

For example, the learning unit 33 performs supervised learning using a neural network. In this case, the learning unit 33 provides a set of the input data and the label (training data) to a neural network composed of a combination of perceptrons. Thereafter, the learning unit 33 performs forward propagation to change the weighting for each perceptron included in the neural net so that the output of the neural network is the same as the label. For example, in the present embodiment, the learning unit 33 performs forward propagation so that the detection result (e.g., position, attitude, size) of the object outputted from the neural network becomes the same as the detection result (e.g., position, attitude, size) of the object of the label.

Then, after performing the forward propagation in this way, the learning unit 33 adjusts the weighting value so as to reduce the error of the output of each perceptron by a technique called back propagation (also called error back propagation method). More specifically, the learning unit 33 calculates the error between the output of the neural network and the label, and compensates the weighting value so as to reduce the calculated error. In this manner, the learning unit 33 learns the features of the training data and recursively acquires a learning model for estimating the result from the input.

The storage unit 34 stores the learning model constructed by the learning unit 33. It should be noted that, in a case in which new training data is acquired after constructing the learning model, the learning model stored in the storage unit 34 is further subjected to supervised learning, whereby the learning model once constructed is appropriately updated.

The learning model stored in the storage unit 34 may be shared with other learning devices. If the learning model is shared by a plurality of learning devices, it is possible to perform supervised learning in a distributed manner in each learning device; therefore, it is possible to improve the efficiency of supervised learning.

By utilizing the learning model thus constructed, the learning device (second detector) 30 detects the picture of the object 2 from the input image 5 including the object 2 captured by the vision sensor 11.

The output presentation unit 35 outputs the detection result (for example, position, attitude, size) of the learning device (second detector) 30, that is, the output of the learning unit 33. The output presentation unit 35 presents the contents of the output of the learning unit 33 to the user by, for example, displaying the contents on the screen.

The image processing device (first detector) 10 and the learning device (second detector) 30 are composed of arithmetic processors such as DSP (Digital Signal Processor) and FPGA (Field-Programmable Gate Array, for example. Various functions of the image processing device 10 and the learning device 30 are realized by executing predetermined software (program, application) stored in the storage unit, for example. The various functions of the image processing device 10 and the learning device 30 may be realized by cooperation between hardware and software, or may be realized only by hardware (electronic circuits).

The storage unit 13 in the image-processing device 10 and the storage unit 34 in the learning device 30 are rewritable memory such as an EEPROM, for example.

Figure 7:
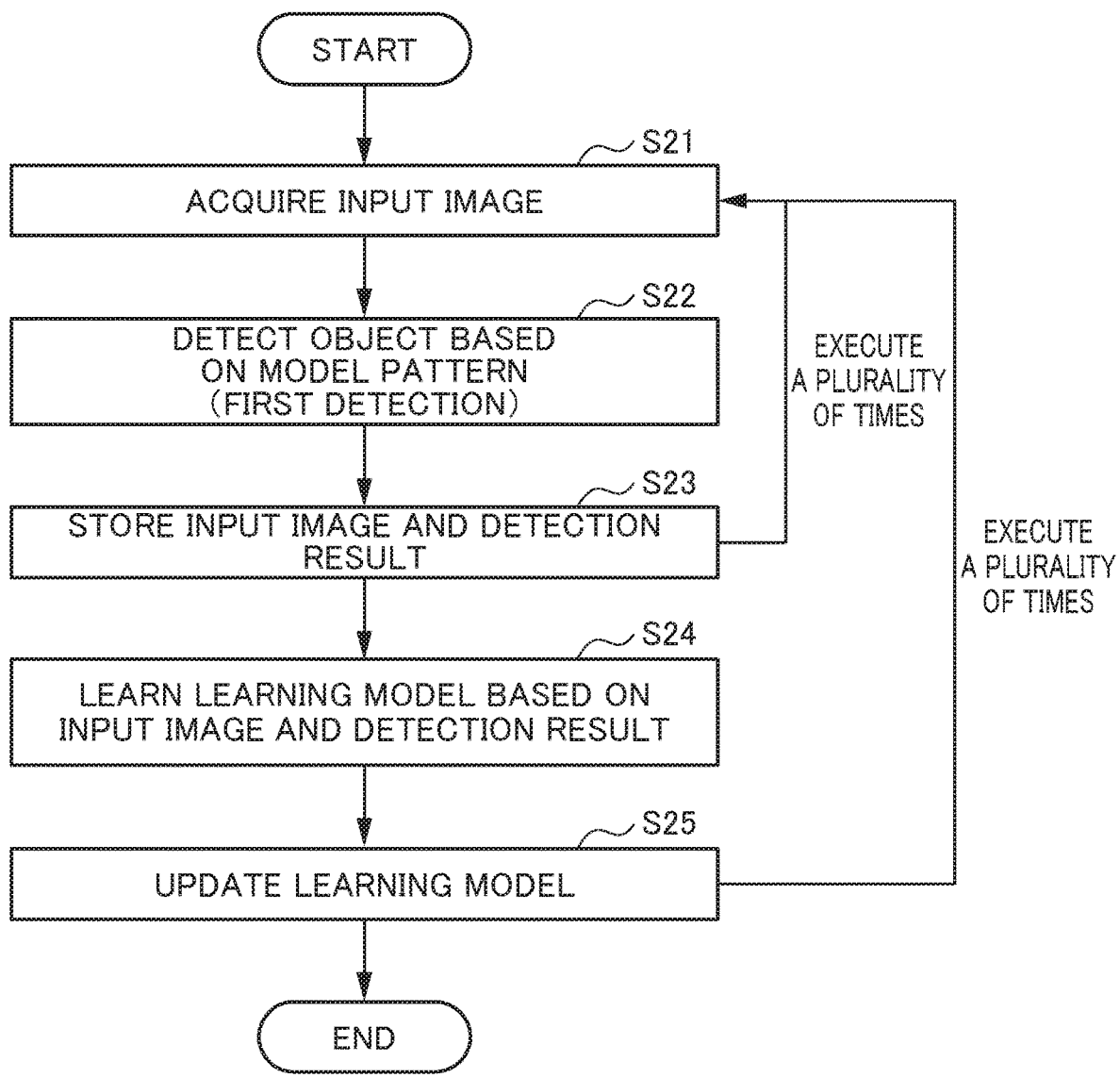
FIG. 7 is a flowchart showing a procedure for learning a learning model.

Hereinafter, an example of learning of a learning model by the image processing device 10 and the learning device 30 will be described. FIG. 7 is a flowchart showing a procedure for learning a learning model.

First, the image processing device 10 acquires an input image 5 including the object 2 captured by the vision sensor 11 (S21).

Next, the image processing unit 12 of the image processing device 10 detects a picture of the object 2 from the input image 5 based on the model pattern representing the feature of the picture of the object 2 (S22). First, the image processing unit 12 extracts feature points from the input image 5. The feature point may be extracted by the same method as the method of extracting the feature point when creating the model pattern. In the present embodiment, edge points are extracted from the input image, and the extracted edge points are used as feature points. Next, the image processing unit 12 performs matching between the feature points extracted from the input image 5 and the feature points constituting the model pattern 50, and detects the object 2.

The input image used for detection by the image processing device (first detector) 10 and the detection result. (e.g., position, attitude, size) by the image processing device (first detector) 10 are stored in the storage unit 13 (Step S23). The set of data between the input image and the detection result may be recorded automatically or at a timing designated by the user.

The processing from Step S21 to Step S23 is executed a plurality of times. Thus, a plurality of sets of data between the input image and the detection result are stored in the storage unit 13.

Next, the learning device 30 learns the learning model using the input image used for detection by the image processing device (first detector) 10 as input data, and using the detection result (e.g., position, attitude, size) by the image processing device (first detector) 10 as training data (Step S24).

The learning mode thus learned 1 is stored in the storage unit 34. Alternatively, the learning model stored in the storage unit 34 is updated in Step S25.

The processing of Step S24 and Step S25 is executed a plurality of times. This improves the accuracy of the learning model.

After learning, in the learning device (second detector) 30, a learning model in which a detection result is returned when the image is given is learned. In a case in which the learning model is learned in such a way, both the detection (first detection) by the image processing device (first detector) 10 based on the model pattern and the detection (second detection) by the learning device (second detector) 30 based on the learning model are executed.

At this time, the image processing system 1 may compare the detection result by the image processing device (first detector) 10 with the detection result by the learning device (second detector) 30, and the image processing system 1 may select a detection result having a higher evaluation value (score) with respect to the detection results. For example, examples of the evaluation value of the detection result by the image processing device (first detector) 10 using the model pattern include a ratio of the number of points of the matched model points. On the other hand, examples of the evaluation value of the detection result by the learning device (second detector) 30 using the learning model include a confidence degree that the learning device outputs.

Alternatively, the evaluation value of the detection result by the learning device (second detector) 30 may be obtained by the same method as the evaluation value of the detection result by the image processing device (first detector) 10. For example, the learning device (second detector) 30 may perform scoring of the detection result outputted from the learning model by using the same method for the detection result by the image processing device (first detector) 10. For example, the ratio of the number of points of the matched model points may be applied to the detection result outputted by the learning model. Thus, it is possible to compare the detection result by the image processing device (first detector) 10 with the detection result by the learning device (second detector) 30 on the same scale.

Alternatively, the image processing system 1 may compare a statistical value in a predetermined period of the detection result by the image processing device (first detector) 10 with a statistical value in a predetermined period of the detection result by the learning device (second detector) 30, and may perform switching so as to perform detection by using a detector having a higher evaluation value calculated from the statistical values. The switching may be performed automatically, or may be presented to the user and performed at a timing permitted by the user.

As described above, according to the image processing system 1 of the present embodiment, the image processing device (first detector) 10 detects a picture of the object 2 from the input image 5 based on the model pattern 50 representing the feature of the picture of the object 2. The learning device 30 learns the learning model on the basis of the detection result by the image processing device 10 and the input image thereof. The learning device (second detector) 30 detects a picture of the object 2 from the input image 5 on the basis of the learning model. With such a configuration, even if learning is used, the training data can be automatically generated by the image processing device (first detector) 10. Therefore, it is unnecessary for the user to collect a large amount of training data. Furthermore, it is possible to improve the workability of the setting of the learning device (second detector) 30. In addition, it is difficult to specify the position and attitude correctly when the user makes the labeling manually. However, according to the present embodiment, it is unnecessary for the user to perform the labeling manually. Moreover, it is possible to improve the detection accuracy of the learning device (second detector) 30. Furthermore, it is possible to improve the robustness by the learning device (second detector) 30 utilizing learning.

Furthermore, according to the image processing system 1 of the present embodiment, it is possible to start the line operation by the image processing device (first detector) 10 before learning the learning model. Thereafter, after the training data is sufficiently collected during line operation, it is possible to switch to the learning device (second detector) 30 based on the learning model.

It should be noted that even if learning is performed using the learning data detected by the image processing device (first detector) 10, the feature to be acquired by the learning device (second detector) 30 in order to detect the learning data will be different from the feature used by the image processing device (first detector) 10. Therefore, it is possible to obtain a learning model using better features for finding the learning data.

Although embodiments of the present invention have been described above, the present invention is not limited to the embodiments described above, and various modifications and variations are possible.

For example, in the embodiment described above, an example in which edge points are used as feature points constituting the model pattern 50 has been described; however, the present invention is not limited to this configuration. Next, a case in which a method different from the above-described embodiment is used as a method for generating the model pattern 50 will be described.

First, a method of extracting a feature point by a method other than an edge point will be described. The feature point can be detected by various methods other than the edge point. For example, a feature point such as SIFT (Scale-Invariant Feature Transform) may be used. It should be noted that methods of extracting SIFT feature points from images are well-known techniques, and detailed descriptions thereof are omitted.

Furthermore, so as to match the contour of the object 2 captured in the image, the model pattern 50 may be created by arranging a geometric figure such as line segments, a rectangle, and a circle. In this case, it suffices if the feature points are provided at appropriate intervals on the geometric figure constituting the contour line for creating the model pattern 50. As a model pattern, an image composed of each pixel can also be used.

In addition, the model pattern 50 is not limited to one composed of feature points. For example, a model pattern may be established by using a condition in which there are equal to or more than a few pixels of areas having equal to or more than a specific luminance value.

In the above embodiment, the image detected by the vision sensor (camera) 11 is the input image 5; however, in the present invention, the image may be an image acquired by other means. For example, CAD data may be used as the input image 5. In the case of two-dimensional CAD data, a model pattern can be created in the same manner as the method using the geometrical figures described above. Furthermore, in the case of three-dimensional CAD data, it suffices if the shape of the object 2 represented by CAD data is projected onto the image to extract feature points from the projected image.

The creation of the model pattern 50 using the CAD data is performed as follows.
(1) Define a local coordinate system in which the origin O is placed on an image (imaging plane) captured by the vision sensor (camera) 11.
(2) The vision sensor (camera) 11 is calibrated in advance. As a result, the three-dimensional point represented by the local coordinate system can be converted into a two-dimensional point on the captured image.
(3) The object 2 represented as CAD data is virtually arranged in the local coordinate system. As a result, the arranged CAD data is represented by the local coordinate system. The relative relationship between the vision sensor (camera) 11 and the object 2 is set to be substantially the same as the relative relationship when actually detecting the object.
(4) Obtain a three-dimensional point group on a contour line at predetermined intervals from the contour line. If necessary, a contour line to be used as a model pattern is designated from the CAD data.
(5) A three-dimensional point group is projected onto an image captured by the vision sensor (camera) 11 to obtain a two-dimensional point group on the image coordinate system. If the direction of the brightness is designated on the CAD data, the direction of the brightness gradient can also be added. Here, the direction of the brightness indicates which of the two regions having the contour line as a boundary is brighter.
(6) The obtained two-dimensional point group on the image coordinate system is converted so as to be represented by the model coordinate system, and stored in the storage unit 13 as a feature point.

As described above, the input image 5 may be image information generated on the basis of CAD data. As described above, various methods can be used for the input image 5. For example, a distance image or three-dimensional point group data can be used as the input image 5.

Furthermore, in the above-described embodiment, the image processing system 1 constituted by the image processing device 10 and the learning device 30 to which a single vision sensor 11 is connected has been described as an example. However, the present invention is not limited to this configuration. Next, an image processing system having a configuration different from the above-described embodiment will be described. It should be noted that, in the following examples, the same reference numerals are assigned to the same configurations as those in the above embodiment, and detailed description thereof is omitted.

Figure 8:
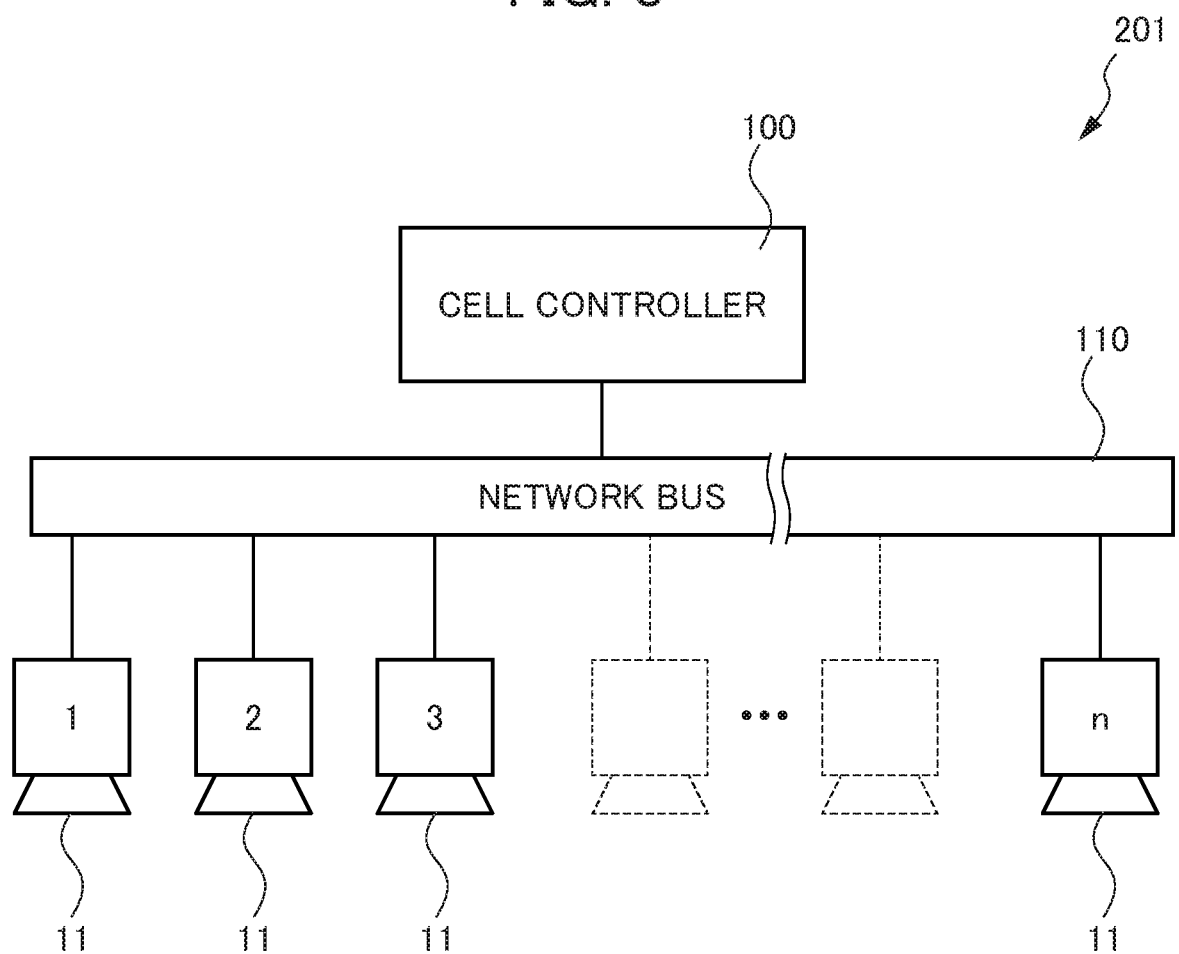
FIG. 8 is a diagram schematically showing an example of an image processing system 201 to which a plurality of vision sensors according to the present embodiment are connected.

FIG. 8 is a diagram schematically showing an example of an image processing system 201 to which a plurality of vision sensors 11 according to the present, embodiment are connected. In FIG. 8, N pieces of the vision sensors 11 as image capturing devices (input image acquisition device) are connected to a cell controller 100 via a network bus 110. The cell controller 100 has the same function as the image processing device 10 and the learning device 30 described above, and acquires the input image 5 of the N pieces of the objects 2 acquired from the N pieces of the vision sensors 11.

Thus, in the cell controller 100 in the image processing system 201 shown in FIG. 8, the image processing device (first detector) 10 detects the picture of the N pieces of the objects 2 from the N pieces of input images 5 in which the N pieces of the objects 2 are captured on the basis of the N pieces of the model patterns representing the features of the images of the N pieces of the objects 2. Furthermore, the learning device (second detector) 30 performs learning of the learning model on the basis of the N pieces of the input images used for detection by the image processing device (first detector) 10 and the N pieces of the detection results by the image processing device (first detector) 10. In this example, the learning process can be sequentially processed on-line.

According to this, it is possible to learn a general-purpose learning device by learning using learning data of various objects 2.

FIG. 9 is a diagram schematically showing an example of an image processing system 301 to which a plurality of image processing device 10 according to the present embodiment are connected. In FIG. 9, m-number of the image processing devices 10 as image capturing devices (input image acquisition devices) are connected to a cell controller 100 via a network bus 110. One or more vision sensors 11 are connected to each of the image processing devices 10. The entire image processing system 301 includes a total of n-number of vision sensors 11.

As described above, in the cell controller 100 in the image processing system 201 shown in FIG. 9, each of the plurality of image processing devices (first detectors) 10 detects a picture of the object 2 from the input image 5 in which the object 2 is captured on the basis of the model pattern representing the feature of the picture of the object 2. Thereafter, the learning device (second detector) 30 performs learning of the learning model on the basis of the N-number of the input images 5 used for detection by the plurality of image processing devices (first detectors) 10 and the N-number of the detection results by the image processing device (first detector) 10. In this example, the learning process can be sequentially processed on-line.

According to this, it is possible to learn a general-purpose learning device by learning using learning data of various objects 2.

EXPLANATION OF REFERENCE NUMERALS 1, 201, 301 image processing system
2 object
4 work table
5 input image
10 image processing device (first detector)
11 vision sensor
12 image processing unit
13 storage unit
20 robot
21 robot hand
25 robot controller
30 learning device (second detector)
50 model pattern
51 model pattern coordinate system
60 model pattern designation area
70 image coordinate system
100 cell controller
110 network bus

What is claimed is:
1. An image processing system comprising:
a vision sensor that obtains an original image in which an object is captured;

a first detector that receives the original image from the vision sensor and uses a model pattern to detect the object contained in the original image, the model pattern being generated based on a physical quantity of each of a plurality of feature points of the object and representing one or more features of the object, the first detector detecting the object contained in the original image by performing matching between the feature points of the object and feature points constituting the model pattern;

a learning device that receives the original image from the vision sensor and learns a learning model using the original image as input data, and using a first detection result of the object contained in the original image detected by performing the matching between the feature points of the object and the feature points constituting the model pattern by the first detector as training data; and a second detector that detects the object contained in the original image based on the learning model learned by the learning device and outputs a second detection result by the second detector to a user.

2. The image processing system according to claim 1, wherein the image processing system selects, from among the first detection result and the second detection result, a detection result having a higher evaluation value with respect to detection results.

3. The image processing system according to claim 2, wherein the image processing system obtains an evaluation value with respect to the second detection result by an identical method as an evaluation value with respect to the first detection result.

4. The image processing system according to claim 1, wherein the image processing system performs switching so as to select a detector having a higher evaluation value calculated from statistical values, from among a statistical value in a predetermined period of the first detection result and a statistical value in the predetermined period of the second detection result.

5. The image processing system according to claim 1, wherein the first detector detects a plurality of objects from a plurality of original images in which the plurality of objects is captured on a basis of a plurality of model patterns representing features of the plurality of objects, and the learning device learns a learning model using the plurality of original images as input data, and using a plurality of detection results by the first detector as training data.

6. The image processing system according to claim 1, further comprising a plurality of first detectors that respectively detect the object contained in a plurality of original images based on the model pattern representing a feature of the object, wherein the learning device learns a learning model using the plurality of original images used for detection by the plurality of first detectors as input data, and using a plurality of detection results by the plurality of first detectors as training data.

7. The image processing system according to claim 1, the first detector using a plurality of edge points to acquire a contour shape of the object to detect the object contained in the original image.

8. The image processing system according to claim 7, the physical quantity of each of the plurality of edge points including a position of each of the plurality of edge points.

9. The image processing system according to claim 8, the physical quantity of each of the plurality of edge points further including a direction of a brightness gradient of each of the plurality of edge points.

10. The image processing system according to claim 9, the physical quantity of each of the plurality of edge points further including a magnitude of the brightness gradient of each of the plurality of edge points.

11. The image processing system according to claim 8, the physical quantity of each of the plurality of edge points further including a magnitude of a brightness gradient of each of the plurality of edge points.

12. The image processing system according to claim 7, the physical quantity of each of the plurality of edge points including a direction of a brightness gradient of each of the plurality of edge points.

13. The image processing system according to claim 12, the physical quantity of each of the plurality of edge points further including a magnitude of the brightness gradient of each of the plurality of edge points.

14. The image processing system according to claim 7, the physical quantity of each of the plurality of edge points including a magnitude of a brightness gradient of each of the plurality of edge points.

15. The image processing system according to claim 1, wherein the second detection result is detected based on features of the object that are different from the plurality of features of the object used by the first detector.

16. The image processing system according to claim 1, wherein the learning device performs forward propagation in which a weighting value of the learning model is changed so that the second detection result output through the learning model becomes a same as the training data.

17. The image processing system according to claim 1, wherein the learning device performs backward propagation in which an error between the second detection result output through the learning model and the training data is calculated, and a weighing value of the learning model is compensated to reduce the calculated error.

* * * * *